V. S. MORLEY.
ADVERTISING DEVICE.
APPLICATION FILED AUG. 17, 1920.

1,430,315.

Patented Sept. 26, 1922.

Inventor
Vivian S. Morley,
By his Attorneys,

Patented Sept. 26, 1922.

1,430,315

UNITED STATES PATENT OFFICE.

VIVIAN STREATFEILD MORLEY, OF TANKERTON, ENGLAND.

ADVERTISING DEVICE.

Application filed August 17, 1920. Serial No. 404,056.

*To all whom it may concern:*

Be it known that I, VIVIAN STREATFEILD MORLEY, a subject of the King of Great Britain, residing at Wynn House, Wynn Road, Tankerton, Kent, England, have invented a new and useful Improvement in Advertising Devices, of which the following is a specification.

This invention relates to improved apparatus for obtaining moving colour effects suitable for advertising, displaying and the like, and more especially to that type of apparatus in which a rear screen is viewed through a front screen placed a certain distance in front thereof, the front screen having on it a number of opaque lines having between them clear spaces, the opaque lines being adapted to cover different portions of the rear screen as the angle of view is altered.

According to this invention I provide a front screen of transparent material with opaque lines which are parallel whilst I provide the rear screen with lines which are of two different alternate colours and are parallel to those on the front screen but are of slightly greater or less width than those of the front screen. The relative width of the lines of the front and rear screens is such that over the breadth covered by each pair of colour bands there shall be a number of pairs of coloured lines on the rear screen, one greater or one less than the number of pairs of clear and opaque lines on the front screen. In cases where the angle subtended by the width of the screen to the eye is large, the rulings on the rear screen may be of equal width and in register with the front screen.

Where it is desired that the colour bars shall travel in opposite directions in different portions of the screen, the width of the lines on either of the screens in one portion of the screen is such that it subtends a greater angle to the eye of the observer than that subtended by the width of the lines on the other screen, while the other portion of the screen has lines of which the width subtends a less angle to the eye of the observer than that subtended by the width of the lines on the other screen.

Figure 1:
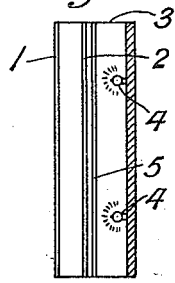
Figure 2:
Figure 3:
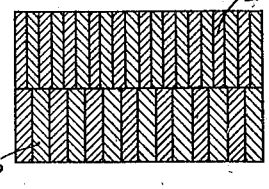
Figure 4:
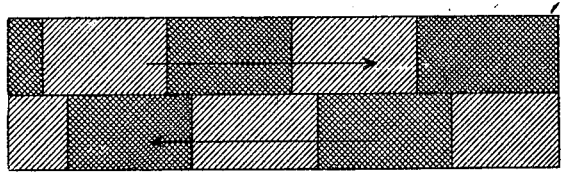
Figure 5:
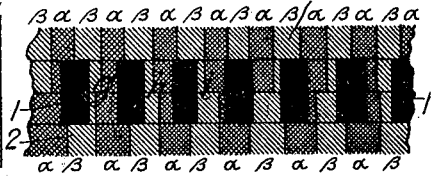
Figure 6:
Figure 7:
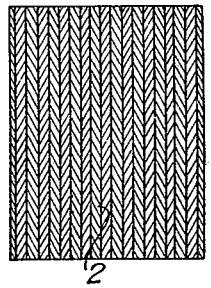
Figure 8:
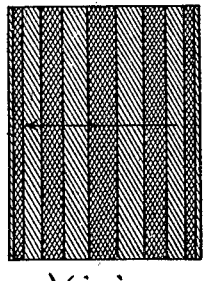

My invention is illustrated in the accompanying drawings, in which Figure 1 is a section of the apparatus to a small scale, Figure 2 shows a front screen, Figure 3 shows a rear screen, Figure 4 shows the effect produced when the screens shown in Figures 2 and 3 are employed in the apparatus shown in Figure 1 and Figure 5 is a diagram showing how the effect of contrary movement is brought about. Figure 6 is a front screen, Figure 7 is a rear screen and Figure 8 shows the effect produced when Figures 6 and 7 are employed.

In Figure 1, 1 is a front screen, 2 a rear screen arranged a distance apart in a casing 3. 4 are lamps mounted on the back of the casing 3 and serve to illuminate the rear screen 2. 5 is a ground glass screen interposed between the rear screen and the lamps 4 to distribute the light.

Referring now to Figures 2, 3, 4 and 5, Figure 2 shows a front screen having opaque lines with clear spaces between them of width equal to that of the lines. Figure 3 shows a rear screen of translucent material, the upper half of the rear screen has lines of alternate colors and of less width and the lower half has lines of alternate colors and of greater width than those of the front screen, each line of color being represented by the space between two adjacent vertical lines, one color being indicated by lines slanting in one direction and the other color being indicated by lines slanting in the other direction. The effect produced in an apparatus employing these screens is shown in Figure 4. The reason for this apparent movement can be explained by referring to Figure 5, which shows on a large scale a strip of the front screen, Figure 2, arranged in front of the rear screen, Figure 3.

Considering the upper half of the screen, and taking any individual clear space $h$, it will be noticed that a portion of a β line and a portion of an α line is visible through $h$. If the observer now moves to the right he will see more of the β line and less of the α line through space $h$, and he will eventually reach a position in which he will see through space $h$ parts of α and β in the proportions originally seen through space $g$. Thus $g$ has apparently moved up to $h$ and thus the whole wave of colour has apparently moved towards the right, that is, in the same direction as that of the observer. Similarly, considering the lower half of the rear screen, in which the lines are of greater width than those of the front screen, if the observer move toward the right he will see through any clear space, say $h$, more of the β line and less of the α line, and will eventually reach a position in which he sees through space $h$ the proportions of $\alpha$ and $\beta$ which he originally saw through space $i$. Thus $i$ has apparently moved up to $h$, and the whole wave of colour has apparently moved to the left, that is to say, in the direction opposite to that of the observer.

Figures 6 and 7 show front and rear screens respectively by means of which colour bars of varying width appear to move at varying speeds as shown diagrammatically in Figure 8. The front screen, Figure 6, is provided with parallel lines of varying widths, the rear screen being provided with parallel lines of equal widths.

What I claim is:—

1. In an advertising device, the combination of two screens one of which is provided with a plurality of parallel opaque lines arranged thereon to obtain intervening clear spaces while the other screen is provided with a plurality of color lines of two different alternate colors parallel to but differing slightly in width from the lines on the first mentioned screen.

2. In an advertising device, the combination of two screens one of which is provided with a plurality of parallel opaque lines arranged thereon to obtain intervening clear spaces, while the other screen is provided with a plurality of color lines of two alternate colors parallel to the lines on the first mentioned screen, some of the color lines being of greater and some of less width than the lines of the first mentioned screen.

3. In an advertising device, the combination of two screens one of which is provided with a plurality of parallel opaque lines of equal width arranged thereon to obtain intervening clear spaces, while the other screen is provided with a plurality of color lines of two different alternate colors parallel to but differing slightly in width from the lines on the first mentioned screen.

4. In an advertising device, the combination of two screens one of which is provided with a plurality of parallel opaque lines arranged thereon to obtain intervening clear spaces, while the other screen is provided with a plurality of color lines of two different alternate colors parallel to but differing slightly in width from the corresponding opaque lines on the first mentioned screen.

5. In an advertising device, the combination of two screens one of which is provided with a plurality of parallel opaque lines arranged thereon to obtain intervening clear spaces, while the other screen is provided with a plurality of color lines of two different alternate colors parallel to but differing slightly in width from the opaque lines on the first mentioned screen, so that different portions of the color lines on the one screen are seen through the clear spaces of the other screen by an observer as the angle of view is altered.

6. In an advertising device, the combination of two screens one of which is provided with a plurality of parallel opaque lines of varying width arranged thereon to obtain intervening clear spaces while the other screen is provided with a plurality of color lines of two different alternate colors parallel to but differing slightly in width from the opaque lines on the first mentioned screen.

7. In an advertising device, the combination of two screens one of which is provided with a plurality of parallel opaque lines of varying width arranged thereon to obtain intervening clear spaces while the other screen is provided with a plurality of color lines of two different alternate colors of equal width and parallel to but differing slightly in width from the opaque lines on the first mentioned screen.

VIVIAN STREATFEILD MORLEY